United States Patent [19]

Pierce

[11] Patent Number: 4,976,223
[45] Date of Patent: Dec. 11, 1990

[54] ADJUSTABLE ANIMAL FEEDING APPARATUS

[75] Inventor: Wesley L. Pierce, 12714 Melville La., Fairfax, Va. 22033

[73] Assignees: Wesley L. Pierce; Donna E. Saul, Fairfax, Va.

[21] Appl. No.: 242,692

[22] Filed: Sep. 9, 1988

[51] Int. Cl.⁵ .............................................. A01K 5/01
[52] U.S. Cl. ..................................... 119/61; 248/128; 248/409
[58] Field of Search ............... 119/61, 51.01; 248/127, 248/128, 146, 161, 162, 408, 409; 312/350, 25, 29; 211/74, 71, 126, 13, 83, 84

[56] References Cited

U.S. PATENT DOCUMENTS

| | | | |
|---|---|---|---|
| 1,855,314 | 4/1932 | Schacht | 119/72 |
| 2,534,114 | 12/1950 | Faris | 119/61 |
| 2,742,877 | 4/1956 | Stoner | 119/61 |
| 2,845,896 | 8/1958 | Copeland | 119/51 |
| 2,850,344 | 9/1958 | Cook | 312/10 |
| 3,651,787 | 3/1972 | Cooper | 119/51 |
| 3,661,121 | 5/1972 | Ziclin | 119/61 |
| 4,044,723 | 8/1977 | Fitzpatrick | 119/61 |
| 4,065,195 | 12/1977 | Fahmie | 312/258 |
| 4,205,629 | 6/1980 | Wix | 119/565 |
| 4,658,759 | 4/1987 | Brown | 119/61 |
| 4,699,089 | 10/1987 | Teschke | 119/51.5 |
| 4,783,971 | 11/1988 | Alba | 312/350 |

OTHER PUBLICATIONS

Front and Side View of Prior Art Adjustable Animal Feeder.

Primary Examiner—John Weiss

[57] ABSTRACT

An adjustable animal feeder includes a support base, at least two arms, a vertically adjustable support plate having an opening for detachably receiving a dish and locking elements for holding the support plate in a selected position. Because the support plate can be positioned and locked at a selected height, the animal which is to feed or drink from the dish held in the opening of the support plate can be accommodated. Posture of and digestion for the animal can therefore be improved. The feeder also includes tracks beneath the support plate for receiving only the dish, only a closure element or both the dish and the closure element for storage thereon. The support base of the feeder can act as a storage compartment or can be designed to fold to a position requiring minimal space. Further, the arms can be integral with or detachable from the base and can have grooves or pegs thereon for accommodating the support plate. The arms may alternatively be designed as a lazy tongs linkage which will be arranged to move the support plate and dish toward the front of the feeder as the support plate is raised. The arms may also be designed with guideways therealong to guide the support plate in vertical adjustment and with locks to hold the support plate in position.

13 Claims, 5 Drawing Sheets

ADJUSTABLE ANIMAL FEEDING APPARATUS

BACKGROUND OF THE INVENTION

1. Field of the Invention

The present invention relates to an adjustable animal feeder and more particular, to an animal feeder for dogs and the like of varying size.

2. Description of the Background Art

Various animal feeders are known in the prior art. Such feeders may be used for large dogs, such as German Shepherds, Dobermans, and Great Danes. These dogs are relatively tall compared to other dogs. This requires that while feeding, such dogs bend their necks downwardly to a feeding tray placed on the ground. Over a period of time, while the dogs are growing, this interferes with their appearance and lines generally. Further, back misalignment and disk problems can occur for the animal or at the very least, digestion will be hindered. For this reason, it is best that such large dogs feed from trays which are elevated from the ground so that they do not have to bend their necks to the ground while feeding.

Various prior art arrangements, however, fail to provide for easy handling of such adjustable feeders and omit storage features for these feeders. Also, while various feeders recognize that stability and easy maneuverability are necessary, these arrangements are often bulky or hard to handle. Further, other prior art arrangements fail to take into account that the animal feeding from the prior art devices will grow over time or that various sized animals will sequentially use the device.

SUMMARY OF THE INVENTION

Accordingly, it is a primary object of the present invention to provide an adjustable animal feeder which can place a feeding dish at a height which will improve an animal's posture and digestion.

It is a further object of the present invention to provide an adjustable animal feeder which can easily be transported or stored and which is compact in design.

It is another object of the present invention to provide an adjustable animal feeder which has a storage compartment provided therein.

It is yet another object of the present invention to provide an adjustable animal feeder which can avoid overfeeding of the animal.

It is yet another object of the present invention to provide an adjustable animal feeder which is sturdy to provide a rigid support and is not susceptible to damage or upsetting by the animal.

Another object of the present invention is to provide an adjustable animal feeder which will accommodate animals of various sizes or can accommodate a single animal as it grows.

The feeder also has an object of avoiding back misalignment and disk problems for animals feeding therefrom.

It is a further object of the present invention to provide an adjustable animal feeder which is lightweight, easily cleaned, and resists corrosion and rust.

Yet, another object of the present invention is to provide an adjustable animal feeder which is inexpensive to manufacture, can easily be produced and maintained, is highly reliable while requiring little maintenance.

These and other objects of the present invention are fulfilled by providing an adjustable animal feeder comprising a support base, at least two arms, a vertically adjustable support plate, a dish and means for locking the support plate at a selected vertical position. The two arms will extend upwardly from the base and the support plate will be operatively connected thereto. This support plate will have an opening therein for receiving the dish which may be detachably inserted thereinto. This dish will hold either food or water as desired. The means for locking will enable the support plate to be positioned at a desired height to accommodate the animal which is to feed or drink from the dish.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figures 1, 2, 3:
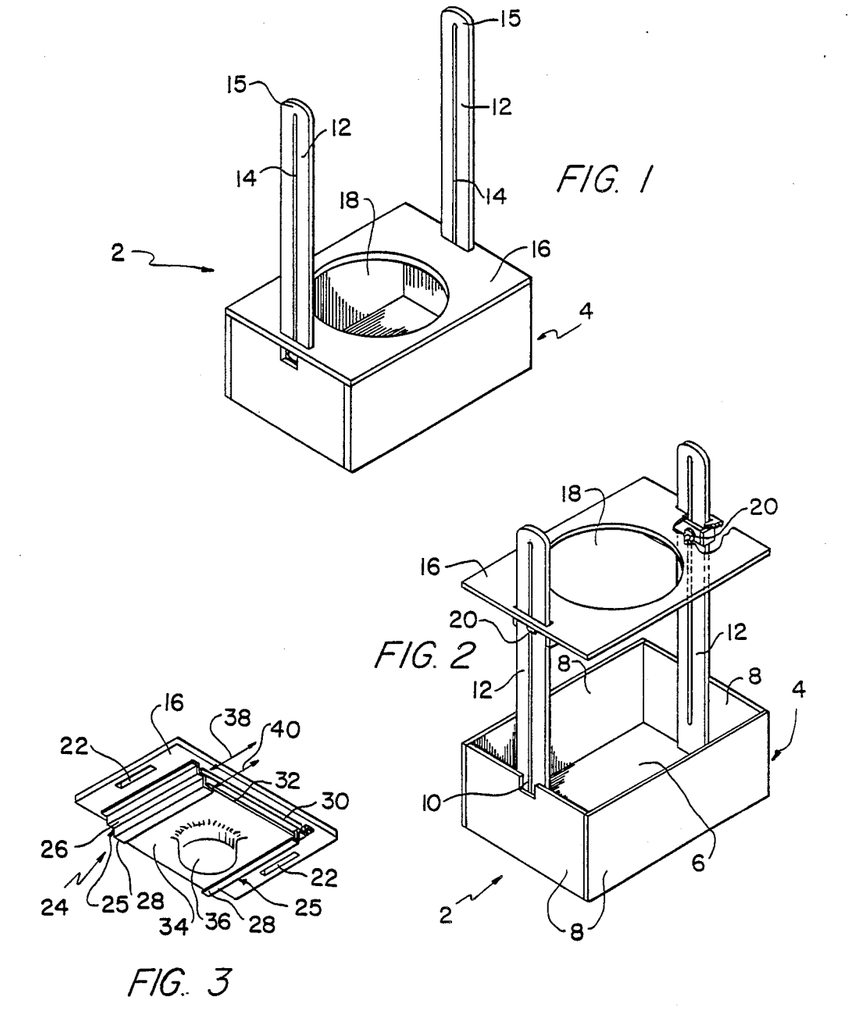
FIG. 1 is a perspective view of an adjustable animal feeder of the present invention.
FIG. 2 is a perspective view of the adjustable animal feeder of FIG. 1 with the support plate in a raised position.
FIG. 3 is a bottom perspective view of the support plate of the present invention.
Figure 4:
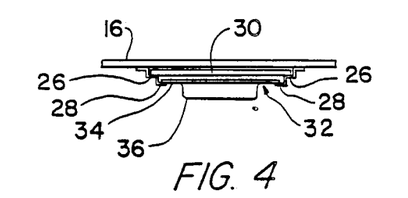
FIG. 4 is a side view of the support plate of the present invention.

Referring in detail to the drawings and with particular reference to FIG. 1, an adjustable animal feeder 2 is shown. This adjustable animal feeder 2 includes a support base 4 and at least two arms 12. As indicated in FIG. 2, the support base 4 consists of four side walls 8 and a bottom 6. While this base 4 is shown as being rectangular, it should be understood that any desired shape can be used. As will be appreciated from a review of the FIG. 1 arrangement, when the support plate 16 is in a position abutting the upper edges of the side walls 8, a storage compartment will be formed within the support base 4. This storage compartment may be used to house food or drink for consumption by the animals as well as any other equipment or material as desired. Furthermore, a dish 32 can be stored within this storage compartment as will be described hereinbelow.

Each of the arms 12 includes longitudinal grooves 14, which extend to the top 15 of the arms. Inserted over these arms 12 is a support plate 16 as will be discussed above. This support plate 16 includes an opening 18 which will receive a dish as will be described below. Support plate 16 may be moved along arms 12 to any selected height which will accommodate an animal which is to feed or drink from a dish which is to be placed in opening 18. Locking means 20 are provided beneath the support plate 16 for fixing this support plate 16 (as well as a dish accommodated in opening 18) at a selected height. As can be seen in FIG. 2, at least two locking means 20 are provided whereby the support plate 16 is locked to each arm 12. A notch 10 is provided in two of the side walls 8 to accommodate the locking means 20 when the support plate 16 abuts the top of the side walls 8. The locking means 20 extends through the longitudinal grooves 14 of the arms 12.

As seen in FIG. 3, a bottom perspective view of the support plate 16 is shown. Two openings 22 are provided on two sides of the support plate 16. The arms 12 will be inserted through these openings 22 such that the support plate may be received thereon. Track means 24 are provided beneath the support plate 16 and are attached thereto. These track means 24 include at least two track elements 25. Each of the track elements 25 consists of a first track 26 and a second track 28. Each track will have a vertical and a horizontal section as can be seen in FIG. 3. As the two track elements 25 face each other, a step arrangement is formed therebetween wherein various devices may be inserted therein. In particular, a closure element 30 and a dish 32 may be slid into the track means 24 for storage thereon. Arrows 38 and 40 indicate this sliding movement. The dish 32 includes a flat edge portion 34 and a bowl portion 36. The bowl portion 36 will receive food, water, or other substance therein to be consumed by the animal. The flat edge portion 34 has been indicated as extending around the bowl portion 36 and forming a rectangular area. It should be appreciated that the size of the bowl 36 may merely be expanded and that the upper lip portions may act as the flat edge portion which is received in the second track 28. Other configurations of this bowl are also possible.

When stored beneath the support plate 16, the dish 32 could be accessed through opening 18. In order to prevent such access to the dish, the closure element 30 is used. When this element 30 is slid into the first track 26, the storage compartment is closed when the support plate 16 abuts the side walls 8. Thus, any food stored within this compartment or even within the dish 32 is inaccessible.

When it is desired to feed an animal from the dish 32, the closure element 30 may be slid from the first track 26. The dish 32 will then be slid from the second track 28 and the bowl portion 36 may be inserted through the top side of opening 18 and support plate 16. Thereafter, the support plate 16 may be moved to the desired height and locked in position by the locking means 20. In this manner, food or liquid may be presented to the animal for consumption. It is additionally noted that the dish 32 may remain beneath the support plate 16 when feeding the animal if so desired.

Figure 5:
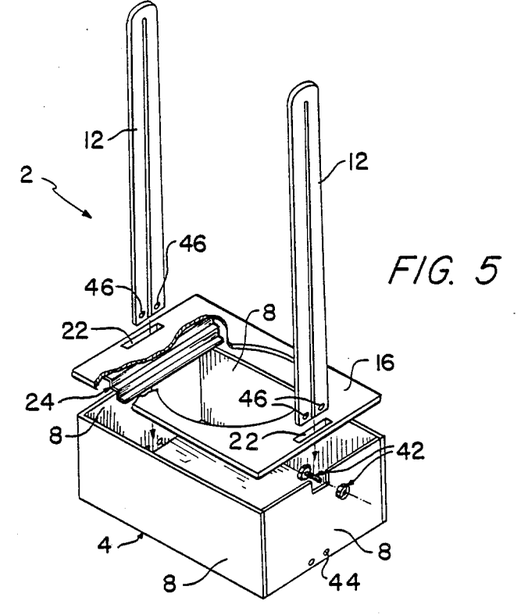
FIG. 5 is a perspective view of a second embodiment of an adjustable animal feeder of the present invention.

In FIG. 5, a second embodiment of the present invention is shown. This embodiment is similar to that shown in FIG. 1 except that the arms 12 are detachably mounted to the side walls 8 of the support base 4 whereas the arms 12 of the FIG. 1 embodiment are integrally attached to the support base 4. As indicated in FIG. 5, a fastening means 42 is provided for affixing the arms 12 to the support base 4. Openings 44 are provided in side walls 8 as well as openings 46 in arms 12. When the arms 12 are inserted through the openings 22 of the support plate 16, and the openings 46 and 44 are in alignment, the fastening means 42 may be inserted through these openings 46, 44 to thereby affix the arms 12 to the support base 4. While a screw and nut arrangement is indicated in FIG. 5 as the fastening means 42, it should readily be appreciated that any known fastening arrangement could be used.

Figure 6:
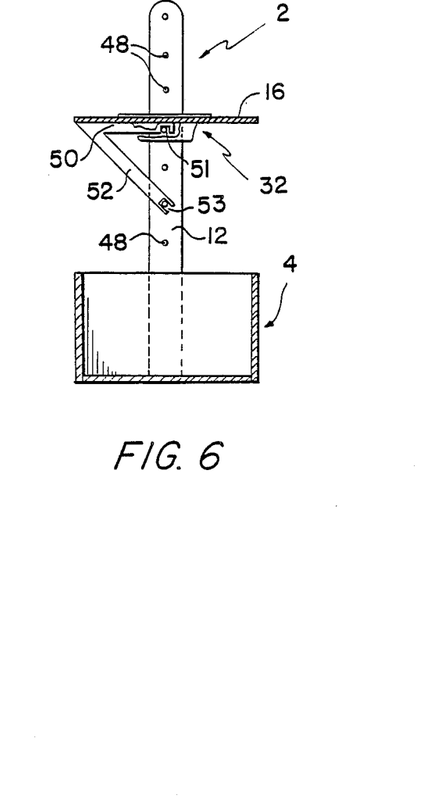
FIG. 6 is a cross-sectional, side view of a third embodiment of an adjustable animal feeder of the present invention.
Figure 7:
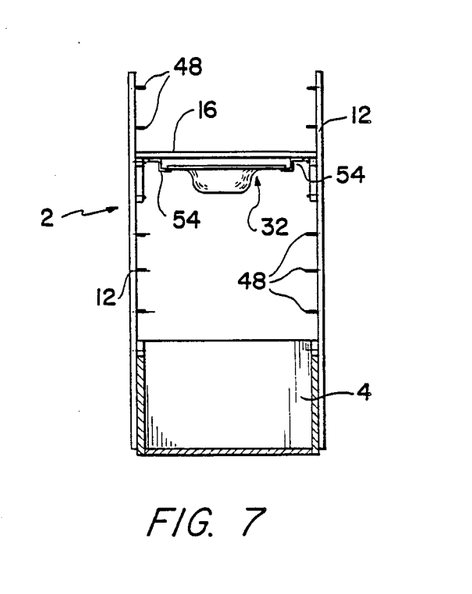
FIG. 7 is a front view of the adjustable animal feeder of FIG. 6.
Figures 8, 9, 10:
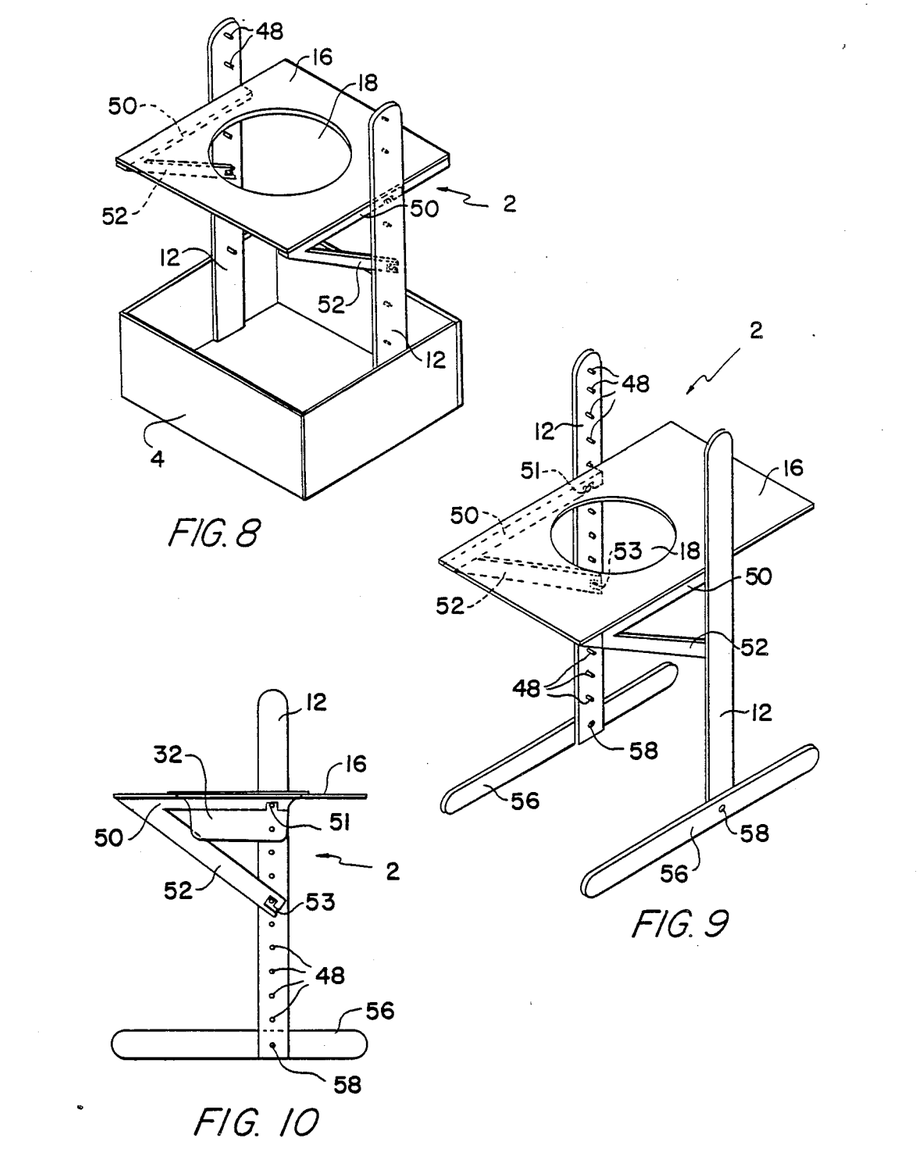
FIG. 8 is a perspective view of a modification of the adjustable animal feeder of FIG. 6.
FIG. 9 is a perspective view of a fourth embodiment of the adjustable animal feeder of the present invention.
FIG. 10 is a cross-sectional, side view of the adjustable animal feeder of FIG. 9.

Now referring to FIGS. 6-8, a third embodiment of the present invention is shown. This adjustable animal feeder 2 is also similar to that shown in FIG. 1 except that the arms 12 have longitudinally aligned pegs 48 thereon. Furthermore, the support plate 16 has a locking means which consists of a first bracket 50 and a second bracket 52. The first bracket 50 has an opening 51 in one end thereof, while the second bracket 52 has an opening 53 in one end thereof. These openings can be inserted onto the various pegs 48 in order to position and lock the support plate 16 at a desired height. In this manner, the support plate 16 may be lowered to a position whereat it abuts the side walls 8 of the support base 4 or is at a height desirable for feeding an animal.

As further seen in FIG. 7, a modified track means 54 is shown. In this arrangement, the track means 54 has only one track whereby the dish 32 may be held thereon. Alternatively, a closure element may be inserted onto this track and the dish will merely be placed inside the area defined by the support base 4. However, this modified track means 54 will not simultaneously receive both a closure element and the dish. While the FIG. 7 arrangement has been shown as having the modified track means 54, it should readily be understood that any arrangement of the adjustable animal feeder 2 may have such a modified track means.

FIG. 8 shows a modified arrangement of the adjustable animal feeder 2 as seen in FIGS. 6 and 7. As can be seen in FIG. 7, the arms 12 are mounted outside the side walls of the support base 4. In the arrangement of FIG. 8, however, the arms 12 are mounted within the side walls of the support base 4. Like modifications can also be done to any of the foregoing disclosed adjustable animal feeders.

Now referring to FIGS. 9 and 10, a fourth embodiment of the adjustable animal feeder 2 is shown. Rather than using a box-like support base 4, this arrangement uses a modified support base 56. This modified support base 56 is connected to the arms 12 by a locking element 58. This locking element permits the modified support base 56 to be at a generally right angle to the arms 12 as seen in FIG. 9 or permits the modified support base 56 to be rotated so as to be generally parallel to the longitudinal axes of the arms 12. Thus, this arrangement may be easily stored and is a very compact design. An optional connection bar or bars (not shown) may be interspaced between the modified support base 56 or the arms 12 in the FIG. 9 arrangement in order to give additional stability to the adjustable animal feeder 2. While such optional bar or bars are not shown in the Figures, it should readily be appreciated how such bars could be incorporated into this feeder. As noted in FIG. 10, the dish 32 has been inserted into the opening 18 of the support plate 16.

Figures 11, 12, 13:
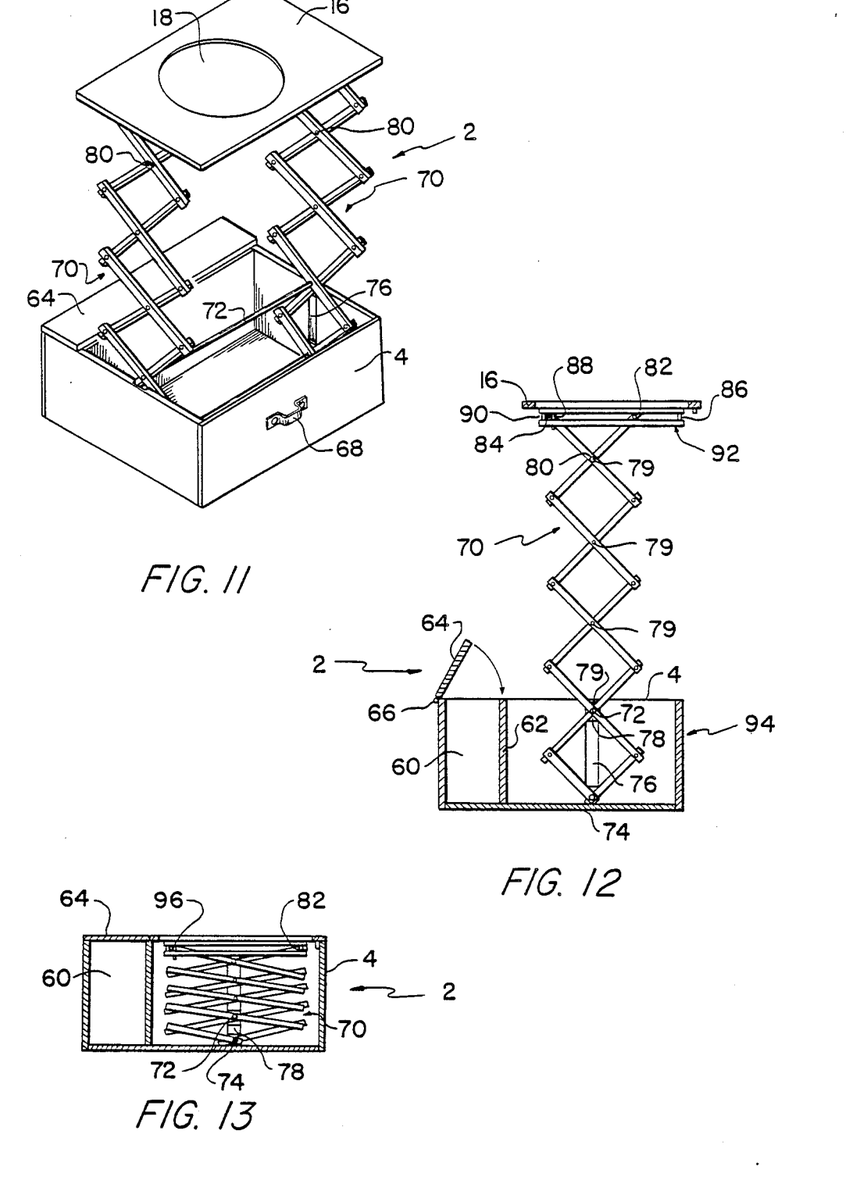
FIG. 11 is a perspective view of a fifth embodiment of the adjustable animal feeder of the present invention.
FIG. 12 is a cross-sectional, side view of the adjustable animal feeder of FIG. 11.
FIG. 13 is a cross-sectional view similar to FIG. 12 showing the support plate in the lowered position.

Now referring to FIGS. 11-13, a fifth embodiment of the adjustable animal feeder 2 of the present invention is shown. In this arrangement, rather than using fixed arms, a lazy tongs linkage arrangement 70 is used for the arms. These lazy tongs linkages may be raised above the support base 4 or may be lowered into and contained within the support base 4 as seen in FIGS. 11 and 13, respectively. An upper interconnection bar 72 is provided between the two opposed lazy tongs linkages 70. Also, a lower interconnection bar 74, as indicated in FIG. 13, is provided between the linkages. These two bars 72, 74 provide for stability between the lazy tongs linkages 70 and prevent them from tending to move toward one another as well as aiding in simultaneous movement of the linkages 70.

Tracks 76 are provided in two of the side walls of the support base 4 which guide guide elements 78 connected to each of the lazy tongs linkages 70. These guides ensure that the central pivots for the lazy tongs linkages 70 will remain longitudinally aligned during vertical adjustment. The uppermost central pivot 79 will have tong locks 80 for holding the lazy tongs linkages 70 and the support plate 16 at a desired height. It should readily be understood that any of the central pivots 79 may contain this lock. Such a lock may consist of a screw and nut arrangement or any other suitable locking means.

At the upper end of each of the lazy tongs linkages 70, a first guide 82 and second guide 84 are provided as indicated. Furthermore, beneath the support plate 16, a track arrangement 92 is provided with a first pin 86, second pin 88, and third pin 90. These pins are arranged such that the second and third pins 88, 90 hold the second guide 84 in position relative to the support plate 16. The first guide 82, however, is free to reciprocate along the track means 92 between the first pin 86 and second pin 88. In this manner, when the support plate 16 is moved from the lowered position as indicated in FIG. 13 to a raised position as indicated in FIG. 12, this support plate 16 will also move forwardly. The forward portion of the adjustable animal feeder 2 is indicated by numeral 94 in FIG. 12. In this manner, the support plate 16 with the opening 18 is moved forwardly as the support plate 16 is raised. Thus, a dish held within the opening 18 can be moved forwardly and food or liquid contained therein may be more easily accessed by the animal. The support base 4 is less likely to be in the way of animal eating or drinking from a dish within opening 18 due to this forward movement of support plate 16.

The support base 4 of the fifth embodiment as shown in FIGS. 11-13 additionally includes a storage compartment 60. This storage compartment 60 is separated from the main portion of the storage compartment by a separation wall 62. A pivotable top 64 having a hinge 66 is provided for this storage compartment 60. This compartment may house grooming equipment, food, or any type of supplies therein. Additionally, a handle 68 is indicated in FIG. 11 for aiding transporting of the adjustable animal feeder 2 is provided. While the foregoing described support bases 4 have not been indicated as having storage compartments 60 or handles 68, it should readily be appreciated that such compartments or handles may be incorporated therein. Furthermore, while a bracket type handle 68 is shown in FIG. 11, it should be readily appreciated that any desired configuration may be used for a handle.

Figure 14:
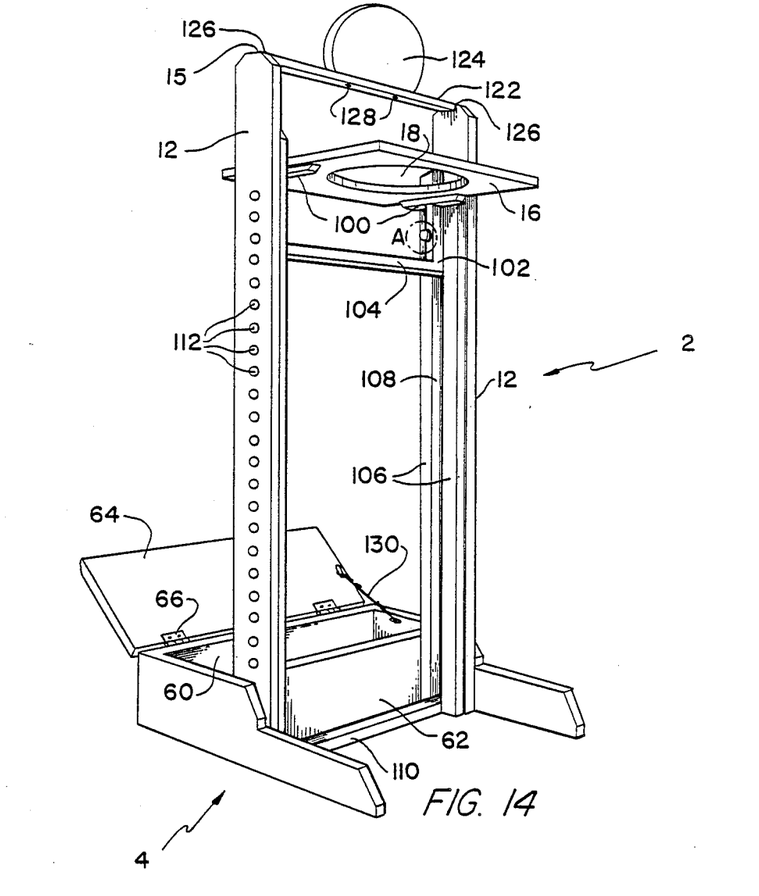
FIG. 14 is a perspective view of a sixth embodiment of the adjustable animal feeder of the present invention.
Figure 15:
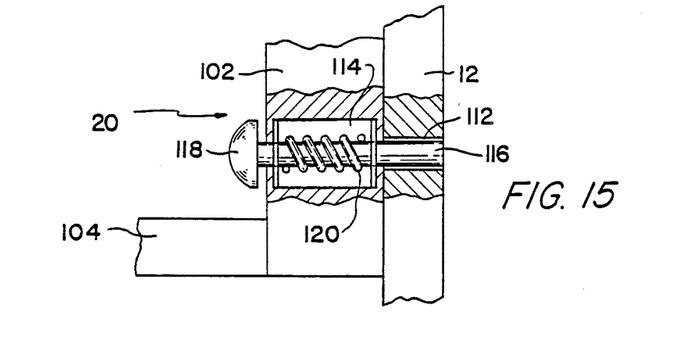
FIG. 15 is a cross-sectional view taken in the area encircled at A in FIG. 14 of a locking means for the support plate.

Referring now to the sixth embodiment shown in FIGS. 14 and 15, a modified form of an adjustable animal feeder 2 of the present invention is shown. In this arrangement, the support plate 16 has horizontal support bars 100 on each side thereof, adjacent the arms 12. Extending downwardly and inside of the horizontal support bars 100 and support plate 16 are vertical support bars or means for interengaging 102. These means for interengaging 102 are interconnected by the support plate 16 at the top side thereof, and by a cross-bar 104 at the lower side thereof.

Two guideways 106 are provided on each arm 12. These guideways form a track 108 therebetween. Through the arms 12, openings 112 are formed. These openings are longitudinally aligned along the length of each of the arms. While FIG. 14 only shows the left-hand arm with openings 112, therein, it should be understood that such openings are also included in the right-hand arm 12. The track 108 is aligned with these openings 112, such that the locking means may pass therethrough in order to hold the support plate 16 in position as will be described hereinafter. As seen in FIG. 14, the guideways 106 extend almost to the top of the arms 12. These guideways 106 may be arranged to leave a sufficient distance between the top cross bar 122 and the top of the guideways 106 such that the support plate 16 with means for interengaging 102 and cross bar 104 may be raised to a position whereat they are clear of the guideways 106 and may be removed therefrom. In other words, the support plate 16 may be raised to a position whereat the means for interengaging 102 no longer engages the guideways 106 and may then be moved horizontally to be disengaged from the guideways 106.

Alternatively, the guideways 106 may extend to the top of each arm 112. The top of each arm is interconnected by the top cross bar 122. Removable elements 126 such as screws or the like, may be provided such that this top cross bar 122 may be detachably affixed to the arms. This cross bar 122 aids in stabilizing the two arms 112 and adding support to the adjustable animal feeder 2. If removable elements 126 are provided, the cross bar 122 may be disengaged from the arms 12. Thereafter, the support plate 16, means for interengaging 102 and cross bar 104 may readily be removed from the guideways 106. Thereafter, the front edge and rear edge of the support plate 16 may be rotated such that they slide into the guideways 106 for storage. In other words, the front edge of support plate 116 may be slid into the right-hand guideway 106 while the rear portion of the support plate 116 may be slid into the left-hand guideway and the entire support plate lowered into the guideways in order to be stored therein. The top cross bar 122 may then be reattached to the arms 12. This top cross bar 122 can be rotated 180 degrees when being reattached such that the sign 124 on the top thereof may be located within the area defined between arms 12. This configuration reduces the area required for storage of the adjustable animal feeder 2.

The top cross bar 122 may have indicia thereon. Furthermore, the sign 124 may have indicia, such as the animal's name, located thereon. Screws 128 or the like may be provided in order to hold the sign 124 on the top cross bar 122.

At the support base 4, a storage compartment 60 is provided. This storage compartment 60 has a front, separation wall 62 with a top 64. A connection 130 is provided between the top 64 and the side of the storage compartment 60 in order to hold the top 64 in an open position. This connection 130 may be a wire connected between the side of the storage compartment 60 and top 64. A bottom support bar 110 is provided between the arms 12.

The interengaging means 102 has the locking means 20 associated therewith. In this embodiment, the locking means 20 is best shown in FIG. 15. In this arrangement, a detent 116 is provided. This detent has an end portion which extends into the various openings 112 formed along arm 12. A further openings 114 is provided in interengaging means 102 for housing the detent 116 and spring 120. By pulling on the head 118 of the detent 116, the spring may be placed in compression. This motion will also remove the end portion of the detent 116 from the openings 112 in arms 12. While FIG. 14 only shows the one locking means 20 (encircled by dotted lines) on the right-hand arm 12, it should readily be understood that a similar locking means may also be provided for the left-hand arm 12.

By pulling on the head 118 of the detent 116, the end portion thereof will be removed from the opening 112. Thereafter, the support plate 116 may be slid along the guideways 106 to the desired vertical position. By moving the support plate 16 in such a manner, the height from which an animal feeds may be readily selected.

The storage compartment 60 is located on the rear side of the adjustable animal feeder 2. The dish, which will be inserted into opening 18 and a majority portion of the support plate 16 are located on a forward side of the adjustable animal feeder 2. When an animal feeds from the dish in the opening 18, downward forces will be applied to the support plate 16. These forces may tend to tip the animal feeder 2 forwardly. However, the support base 4 adequately holds the feeder in position. Additionally, the provision of the storage compartment 60 further aids in prevention of tipping of the animal feeder 2. The weight of storage compartment 60 acting as a counterbalance, as well as the various interconnections between arms 12, results in a very sturdy and stable animal feeder while permitting ready adjustment thereof.

While track means 24 are not shown on the lower side of support plate 16, it should readily be understood that the track means may be incorporated into this feeder.

The foregoing described adjustable animal feeders 2 may be made from metal, wood, Plexiglas, or any other desired material. These animal feeders are relatively compact and can be easily transported. Various arrangements of these feeders can provide for storage of food, liquid, or any other desired materials. These feeders may be carried easily within the trunk of a car and are easily manufactured and maintained. If the adjustable animal feeder 2 were to be used for dogs, it is possible to only put a slight amount of food in the dish 32 before showing the dog in order to make the dog more responsive during showing while keeping a remaining supply of food within a storage compartment of the device for later feeding of the dog. By adjusting the height from which an animal feeds or drinks from the device, digestion for the animal, as well as appearance and lines of the animal may be maintained.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An adjustable animal feeder comprising:
   a support base having a front and rear side;
   at least two arms extending upwardly from said base, each of said at least two arms having guideways along the length thereof;
   a vertically adjustable support plate operatively connected to each of said at least two arms, said support plate having a generally flat top surface with an opening defined therein;
   means on said support plate for interengaging with said guideways whereby said support plate can be moved along the length of said at least two arms to a selected vertical position;
   a dish detachably insertable into said opening in said support plate for receiving one of food and water therein;
   means for locking said support plate at the selected vertical position, said vertical position being selected to accommodate height of an animal which is to feed or drink from said dish, said means for locking being operatively connected to said means for interengaging; and
   a compartment on the rear side of the support base, said support plate extending between said at least two arms and projecting toward the front side of the support base, said compartment acting as a counterbalance to downward forces applied to the support plate whereby said support base with the compartment prevents the feeder from tipping over when an animal feeds therefrom.

2. The adjustable animal feeder as recited in claim 1, further comprising track means for selectively receiving at least said dish for storage beneath said support plate, said track means being mounted on an underside of said support plate and being proximate to said opening.

3. The adjustable animal feeder as recited in claim 1, wherein each of said arms have a plurality of longitudinally spaced openings within said guideways, said openings receiving a portion of said means for locking to hold said support plate in said selected vertical position.

4. The adjustable animal feeder as recited in claim 3, wherein said means for locking comprises a movable, spring biased detent, said portion of said means for locking comprising an end of said detent which is slidable into and out of said spaced openings, said means for locking being movable along the length of the arms with the support plate and said portion being slid into a selected opening to lock said support plate in position when said plate is at said selected vertical position.

5. The adjustable animal feeder as recited in claim 1, wherein only two arms are provided and further comprising a cross bar extending between said arms at both the upper and lower ends thereof.

6. An adjustable animal feeder comprising:
   a support base;
   at least two arms extending upwardly from said base;

a vertically adjustable support plate operatively connected to each of said at least two arms;

means for locking said support plate at a selected vertical position, said vertical position being selected to accommodate height of an animal which is to use the feeder; and a compartment attached to one side of the support base for acting as a counterbalance to downward forces applied to the support plate whereby said support base with the compartment prevents the feeder from tipping over when an animal feeds therefrom.

7. The adjustable animal feeder as recited in claim 6, further comprising:

a dish detachably insertable into an opening defined in a top surface of the support plate; and track means for selectively receiving at least said dish for storage beneath said support plate, said track means being mounted on an underside of said support plate and being proximate to the opening.

8. The adjustable animal feeder as recited in claim 6, wherein each of said at least two arms have guideways along the length thereof and wherein said support plate has means for interengaging with said guideways whereby said support plate can be moved along the length of said arms to said selected vertical position and wherein said means for locking its operatively connected to said means for interengaging.

9. The adjustable animal feeder as recited in claim 8, wherein each of said at least two arms have a plurality of longitudinally spaced openings within said guideways, said openings receiving a portion of said means for locking to hold said support plate in said selected vertical position.

10. The adjustable animal feeder as recited in claim 9, wherein said means for locking comprises a movable, spring biased detent, said portion of said means for locking comprising an end of said detent which is slidable into and out of said spaced openings, said means for locking being movable along the length of the arms with the support plate and said portion being slid into a selected opening to lock said support plate in position when said plate is at said selected vertical position.

11. The adjustable animal feeder as recited in claim 9, wherein the support base has the one side with the compartment attached thereto and further has a second side opposed to the one side, the support plate being positioned between said at least two arms and projecting in a direction toward the second side of the support base.

12. The adjustable animal feeder as recited in claim 6, wherein the support base has the one side with the compartment attached thereto and further has a second side opposed to the one side, the support plate being positioned between said at least two arms and projecting in a direction toward the second side of the support base.

13. The adjustable animal feeder as recited in claim 6, wherein a cross bar is provided between said at least two arms.

* * * * *